(12) United States Patent
La Cascia, Jr. et al.

(10) Patent No.: US 6,308,146 B1
(45) Date of Patent: *Oct. 23, 2001

(54) SYSTEM AND METHOD FOR SIMULATING USER INPUT TO CONTROL THE OPERATION OF AN APPLICATION

(75) Inventors: Leo J. La Cascia, Jr., Highlands Ranch; James E. Downum, Denver, both of CO (US)

(73) Assignee: J. D. Edwards World Source Company, Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,869

(22) Filed: Oct. 30, 1998

(51) Int. Cl.[7] ............................. G06F 11/263; G06F 9/455
(52) U.S. Cl. ................................ 703/22; 703/20; 703/21; 703/24; 712/227; 714/46; 345/335; 345/347
(58) Field of Search ................................. 703/13, 20, 27, 703/16, 22, 21, 24; 395/700; 345/335, 347; 712/227; 714/46

(56) References Cited

U.S. PATENT DOCUMENTS

| | | |
|---|---|---|
| 5,045,994 | 9/1991 | Belfer et al. . |
| 5,226,162 | 7/1993 | Daw . |
| 5,418,941 | 5/1995 | Peters . |
| 5,594,892 | 1/1997 | Bonne et al. . |
| 5,600,789 | 2/1997 | Parker et al. . |
| 5,657,438 | 8/1997 | Wygodny et al. . |
| 5,754,755 | 5/1998 | Smith, Jr. . |
| 5,774,725 | 6/1998 | Yadav et al. . |
| 5,781,720 | * 7/1998 | Parker et al. .................... 395/183.14 |
| 5,950,010 | * 9/1999 | Hesse et al. ......................... 395/712 |
| 6,016,394 | * 1/2000 | Walker .................................. 395/701 |

* cited by examiner

*Primary Examiner*—Kevin J. Teska
*Assistant Examiner*—Thai Phan
(74) *Attorney, Agent, or Firm*—Sheridan Ross P.C.

(57) ABSTRACT

The system for simulating user input to control the operation of an application includes a processor and software operable on the processor to enable the selection of application specification information and execution input information. The selected application specification information is indicative of execution parameter information to facilitate the identification of application parameter information. The selected application specification information and execution input information is maintained on a storage device, and is indicative of a desired operation of the application. In order to simulate user input, the software provides the execution input information to the application parameter information when the execution parameter information corresponds substantially to the application parameter information to achieve the desired application operation.

26 Claims, 18 Drawing Sheets

FIG. 15

SYSTEM AND METHOD FOR SIMULATING USER INPUT TO CONTROL THE OPERATION OF AN APPLICATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Technical Field

The present invention relates in general to a system and method for simulating user input. The invention more particularly relates to a system and method for simulating user input to control the operation of a software application in accordance with a desired application operation.

2. Background Art

Systems capable for simulating user input to test the operation of an application in a System Under Test ("SUT") are well known. For example, reference may be made to the following U.S. Pat. Nos.: 5,045,994; 5,226,162; 5,418,941; 5,594,892; 5,600,789; 5,657,438; 5,754.755; and 5,774,725.

U.S. Pat No. 5,657,348 discloses a user input simulation system for developing a test script to control an application. The system includes an editor for enabling a user to manually develop the test script using statements in a Test Script Language ("TSL") in a manner similar to programming in the C language. Similarly, modifications to the test script must be made manually by editing the test script statements.

Although scripting in TSL permits the user to adequately control the operation of the application, the user must be sufficiently knowledgeable about command statements in TSL to create a useful test script. Consequently, the development of test scripts requires the user to understand both the operation of the application to be tested as well as a programming language.

Therefore, it would be highly desirable to have a new and improved user input simulation system and method that enables a user to develop a test script for simulating user input to control an application, wherein the user can develop the test script without having to know how to create test script statements in a programming language.

The user input simulation system described in U.S. Pat. No. 5,657,348 also includes a Capture, Replay and Verify ("CRV") module that cooperates with a translator unit for developing a test script. The CRV module captures input information and image information generated by the application in the form of assembler-like commands. The assembler-like commands are translated into TSL commands by the translator unit to form the test script.

While the CRV module/translator unit combination substantially reduces the need for the user to know how to program in TSL, the capturing process makes the user input simulation system dependent upon a display screen (x,y) coordinate system. In this regard, the capturing process will capture the entry of input information at a particular data entry point as determined by a screen cursor position, and will develop a TSL statement indicative of the (x,y) location of the data entry point. For applications using windows in graphical user interface, the position of the data entry point can vary as the corresponding window is moved or resized. As a result, TSL statements incorporating (x,y) coordinates can cause the test script to execute commands that might not be recognized by the application, thereby affecting the effectiveness of the test script.

Therefore, it would also be highly desirable to have a new and improved user input simulation system and method that can develop test scripts independently of the (x,y) coordinates of an application's data entry points as displayed on a display screen. Such a system and method should control the operation of a software application in a windows environment no matter how the windows are arranged.

SUMMARY OF THE INVENTION

Therefore, the principal object of the present invention is to provide a new and improved system and method for simulating user input to control an application, wherein a user of the test script development system is not required to be knowledgeable about programming in a computer language. Such a system should not be dependent upon an (x,y) coordinate system and should also be suitable for use in a windows environment.

Briefly, the above and further objects of the present invention are realized by providing a new and improved user input simulation system and method which is not dependent on an (x,y) coordinate system and does not require computer programming expertise.

The system for simulating user input to control the operation of an application includes a processor and software operable on the processor to enable the selection of application specification information and execution input information. The selected application specification information is indicative of execution parameter information to facilitate the identification of application parameter information. The selected application specification information and execution input information is maintained on a storage device, and is indicative of a desired operation of the application. In order to simulate user input, the software provides the execution input information to the application parameter information when the execution parameter information corresponds substantially to the application parameter information to achieve the desired application operation.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 5–15 are screen shots of window displays illustrating the development of an exemplary test script in a playback mode using the system of FIG. 1.

BEST MODE FOR CARRYING OUT THE INVENTION

Figure 1:
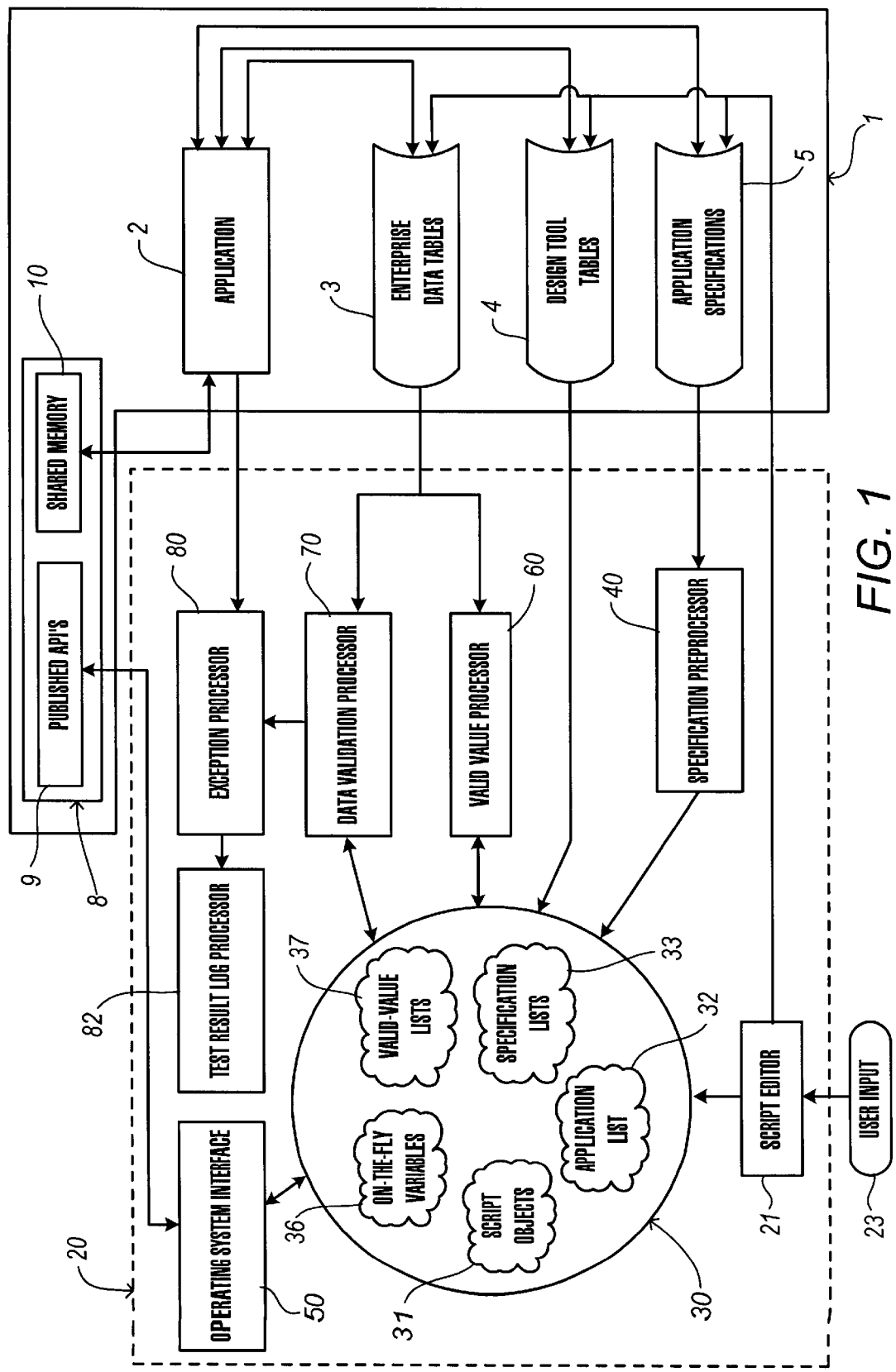
FIG. 1 is a block diagram illustrating a user input simulation system constructed in accordance with the present invention.

Referring now to the drawings, and more particularly to FIG. 1 thereof, there is shown a user input simulation system 20 constructed in accordance with the present invention. The system 20 enables a user to develop a test script for simulating user input to non-intrusively test the operation of a System Under Test ("SUT") 1 including an application 2, in accordance with the method of the present invention. The SUT 1 also includes enterprise data tables 3, design tool tables 4 and application specifications 5 that define the application 2.

A method and system for defining the application 2 by the enterprise data tables 3, design tool tables 4 and application specifications 5 is described in co-owned, and co-pending, U.S. patent application Ser. No. 08/756,067, entitled "SYSTEM AND METHOD FOR CUSTOMIZED APPLICATION PACKAGE BUILDING AND INSTALLATION," which patent application is incorporated by reference as if fully set forth herein.

As described thereof, the application 2 includes one or more forms that define how the application 2 can process business information stored in the enterprise data tables 3. The forms contain form or edit controls for enabling the user to review and/or modify the business information. The form controls can include, for example, "type to a data entry field," "press a button." "check a radio button," and "select a menu option" form controls.

The application specifications 5 contain specification files for the elements of the application 2, including the forms and the form controls, and each specification file is configured in a table access management ("TAM") file structure. The design tool tables 4 include an object librarian (not shown) that provides application configuration information including an inventory of files associated with the application 2, and any associated form specification files. As described in more detail below, the system 20 utilizes the application specifications 5 to simulate mouse and keyboard events to control the execution of the application 2 according to a test script.

The SUT 1 further includes an operating system 8 comprising operating system software, such as Microsoft® Windows NT® operating system software from Microsoft Corporation of Redmond, Wash., to facilitate the execution of the application 2. The operating system 8 provides a graphical user interface to the application 2, and includes a directory of published application programming interface functions ("APIs") 9 and a shared memory 10. While the Microsoft® Windows NT® operating system software is described in the preferred embodiment, other operating systems that provide a graphical user interface may also be used. One skilled in the art will understand the operation of the operating system 8, however a brief review of the operating system 8 is presented below to aid in the understanding of the present invention.

The operating system 8 creates and manages objects or "windows" for the graphical user interface that correspond to the application specifications 5, including forms and form controls. utilized by the application 2. To facilitate the management of the windows, the operating system 8 maintains application parameter information for each window in the shared memory 10. The application parameter information includes handle, class, style, caption text, position, control identifier, owner and parent information used by the operating system 8 to control the operation of the application 2. A group of windows can be related to one another according to a hierarchical parent/child relationship, and such a relationship is identified by the application parameter information. An important feature of the application parameter information as it relates to the present invention is that the application parameter information for each window or group of windows is substantially unique, and can define a recognizable and searchable pattern corresponding to the desired operation of the application 2.

The APIs 9 are responsive to input information, such as mouse and keyboard events, for sending operating system commands to the windows maintained in the shared memory 10, wherein the application parameter information corresponding to the windows is updated. The operating system commands include handle information to identify the appropriate window, or group of windows, associated with the input information, and updated parameter information to update the corresponding application parameter information according to the input information.

In order to facilitate the development of the test script, the software-implemented system 20 includes a script editor 21 responsive to user input 23 for selecting the application specifications 5. A scripting memory 30 receives the selected portion of the application specifications 5 from the SUT 1, and maintains the selected portion as specification lists 33. The selected portion of the application specifications 5 corresponds to the desired operation of the application 2 to be executed by the test script. The script editor 21 utilizes the specification lists 33 to construct and display the test script, wherein the test script includes one or more displayed command lines for controlling the execution of the application 2. In the preferred embodiment of the present invention, the script editor 21 is constructed using the Microsoft® Visual C++® development system from Microsoft Corporation of Redmond, Wash.

As will be described in greater detail with reference to FIG. 8, the command lines display context and action information for the desired operation of the application 2. Each command line is indicative of an underlying script object 31 constructed in the C++ programming language, and containing routine and data information for the desired operation of the application 2. The routine information includes commands for displaying the context and action information, as well as data information, in the command line. The data information can also be selected by the script editor 21 to define execution input information to be supplied to the operating system 8 as the input information to execute the application 2 as desired.

Each script object 31 also includes routine information for constructing execution parameter information from the application specifications 5 that defines a signature for an edit control corresponding to the desired operation of the application 2. The signature is determined by the specification lists 33 which mirror the visual window components of the edit control for the desired application operation, wherein the signature corresponds to a window or group of windows defined by one or more parent-child relationships that are maintained by the operating system 8 for the desired edit control. Additional routine information contained in the script object 31 initiates a call to the APIs 9 to perform a search using the "Enum Windows" and "EnumChildWindows" functions for identifying the application parameter information corresponding substantially to the execution parameter information, and to retrieve the handle information for the window or group of windows whose application parameter information corresponds substantially to the signature.

Using the retrieved handle information, the script object 31 provides the execution input information to the operating system 8 as the input information for updating the identified application parameter information, including the appropriate window or group of windows as identified by the retrieved handle information. The operating system 8 uses the updated window or group of windows to update the edit control to control the operation of the application 2 according to the desired operation as selected by the script editor 21. As a result, the script object 31 simulates user input such as mouse or keyboard events required to execute the application 2 according to the desired operation.

The object-oriented model for enabling the script object 31 to update the application parameter information includes a ScriptObject object, a ScriptControl object, and a ScriptControlEdit object. The ScriptControlEdit object is derived from a ScriptControl object, which in turn is derived from a ScriptObject object. The methods and properties for ScriptObject objects are set forth in Table 1 below.

TABLE 1

ScriptObject

| Methods | Properties |
|---|---|
| Script Playback Methods: | m_nRepeatCountMax |
| Execute() | m_idApplication |
| PrePlay() | m_nScriptObjectType |
| Play() | m_nValueFrom |
| GetVariableValueFromTree() | m_csValueFrom |
|  | m_csObjectName |
|  | m_dwFlagStatistics |
|  | m_dwFlagPlayback |
|  | m_rtReturn |
|  | m_nRepeatCount |
|  | m_pScriptObject- Parent |
|  | m_pScriptObjects |
| Script Construction Methods: |  |
| Insert() |  |
| RemoveAll() |  |
| Serialize() |  |
| VSerialize() |  |
| Print() |  |
| Navigation Methods: |  |
| GetParentWithOPTION() |  |
| GetParentScopedObjectsOfType() |  |
| ParentScopedObjectExists() |  |
| GetChildObjectsOfType() |  |
| GetChildObjectsWhereValueFromAndValue- Match() |  |
| GetObjectsOfTypeBefore() |  |
| GetObjectsOfTypeAfter() |  |
| GetObjectsOfTypeBeforeAfter() |  |
| ChildCount() |  |
| ToggleBreakpoint() |  |
| General Purpose Methods: |  |
| FormatForShow() |  |
| Show() |  |
| IsType() |  |
| GetNextValueFromDataTable() |  |
| Count() |  |

The methods and properties for ScriptControl objects are set forth in Table 2 below.

TABLE 2

ScriptControl

| Methods | Properties |
|---|---|
| Preplay() | m_idForm |
| Play() | m_csFormCaption |
| Show() | m_idControl |
|  | m_idObject |
| ScrubAmpersand() | m_nSpyDataType |
| ScrubCRLF() | m_csObject |

The methods and properties for ScriptControlEdit objects are set forth in Table 3 below.

TABLE 3

ScriptControlEdit

| Methods | Properties |
|---|---|
| Preplay() | None |
| Play() |  |
| Show() |  |

Figure 2:
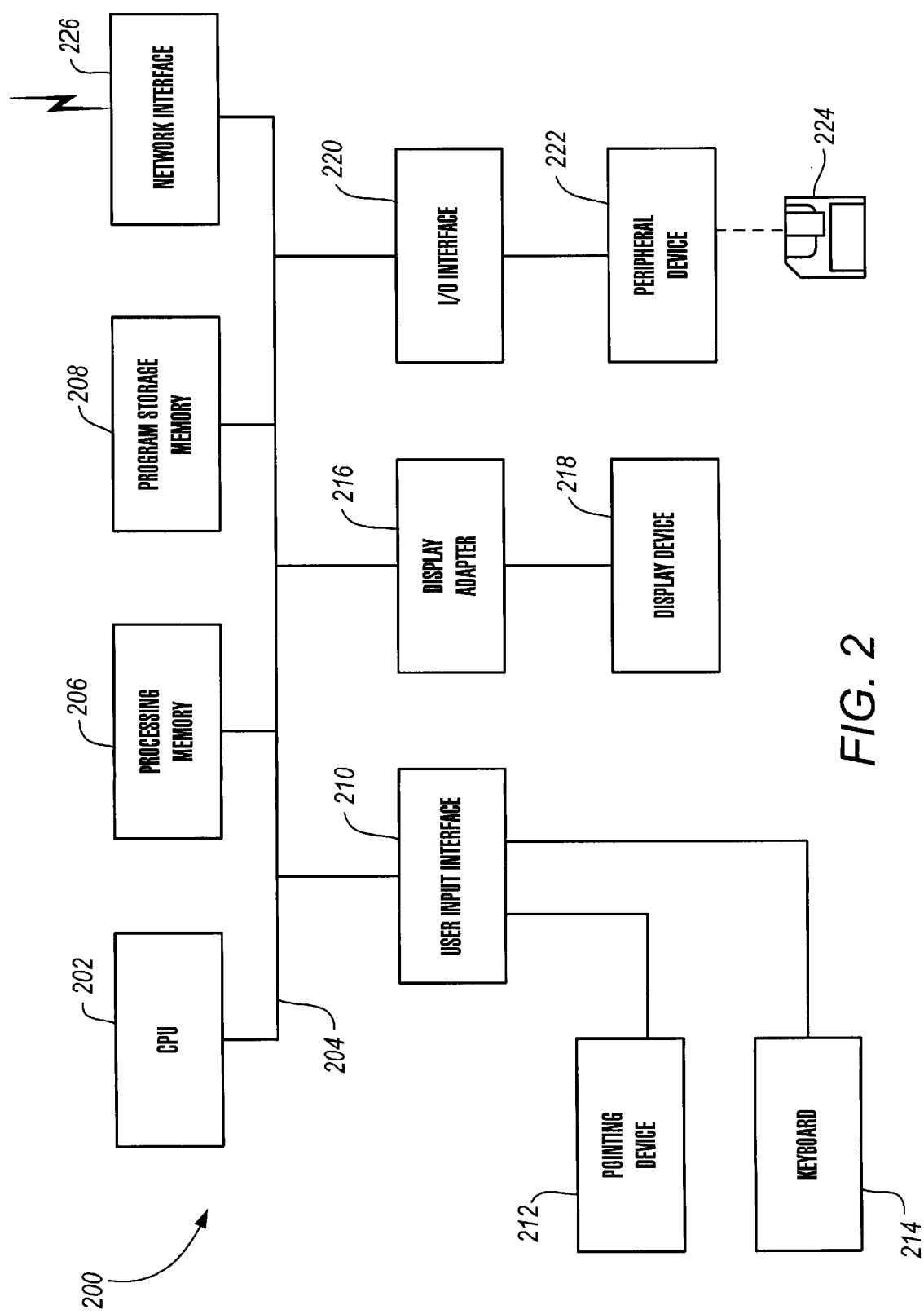
FIG. 2 is a block diagram illustrating a general purpose computing system for use in connection with the system of FIG. 1.

In the preferred embodiment, the system 20 and the SUT 1 are implemented in a general purpose computing or information processing system 200 (FIG. 2). The processing system 200 includes a central processing unit ("CPU") 202 connected by a bus 204 to a processing storage or memory device 206 and a program/data storage or memory device 208 for executing the application 2 (FIG. 1). Although the system 20 and the SUT 1 are described in this preferred embodiment as being implemented in the processing system 200 alone, the system 20 and the SUT 1 call be implemented in two or more processing systems similar to the processing system 200.

The application 2, enterprise data tables 3, design tool tables 4, application specifications 5, operating system 8 and system 20 are maintained on the storage device 206 and the storage device 208 for helping to control the operation of the CPU 202 in accordance with the present invention.

The processing system 200 further includes a user input interface 210 connected to the bus 204 for enabling the user to interact with the application 2 (FIG. 1 ) via a pointing device 212, such as a mouse, and also with a keyboard device 214. To provide a visual display, the processing system 200 also includes a display device 218 connected to the bus 204 through a display adapter 216.

An input/output ("I/O") interface 220 is connected to the bus 204 to permit a peripheral device 222 to interface with the processing system 200. The peripheral device 222 includes a disk drive for reading and/or wiring electronic information to computer usable storage medium such as a magnetic disk 224. Other peripheral devices, including tape drives and compact disk drives, can also be incorporated into the processing system 200.

A network interface 226 is also connected to the bus 204 to enable the processing system 200 to share electronic information with other processing systems (not shown).

Considering now the system 20 in greater detail with reference to FIG. 1, the script editor 21 is operative on the CPU 202 to display a list of all applications available for testing, including the application 2, and to store the available applications in an application list 32. The object librarian determines the contents of the application list 32.

The script editor 21 displays the application list 32 to permit the selection of the application 2 from the application list 32, wherein the application specifications 5 corresponding to the selected application 2 are transmitted to the memory 30 as the specification lists 33 and are displayed as possible selections. As described previously, the object librarian determines the application specifications 5 that correspond to the application 2.

A specification preprocessor 40 is responsive to the script editor 21 to query the application specifications 5 for extracting:

version specifications describing unique initialization information for each version of the selected application;

form specifications describing the overall form type, size, caption and base functionality for each form displayed by the application;

control specifications describing each control (e.g., button, edit field, check box) which has been placed on each selected form;

grid column specifications describing the column in any grid control appearing on any form;

table specifications describing any data tables that are read or updated by the application;

table column specifications describing data columns in each of the tables referenced; and data structure specifications describing each element of each data structure used in any portion of the application.

The output of the specification preprocessor 40, the specification lists 33, are maintained in the scripting memory 30 as a collection of pointers and data elements extracted from the application specifications 5 and organized in a tree-like structure. The tree-like structure of the extracted specification lists 33 mirrors the tree-like structure maintained by the operating system 8 as it manages the visual window components of the application 2.

The script editor 21 also enables the user to create and store on-the-fly variables 36 for use by the script objects 31. For example, the on-the-fly variables 36 can be used as execution input information or as counters to determine the execution input information provided to the operating system 8.

A valid value processor 60 and a data validation processor 70 are connected to the enterprise data tables 3 to facilitate the execution of the application 2 within set operational parameters. The valid value processor 60 is operable to retrieve valid value lists 37 from the enterprise data tables 3 that correspond to the selected application 2 and specification lists 33.

The data validation processor 70 is operable to retrieve expected values resulting from the operation of the application 2. Where the operation of the application 2 results in values differing from the expected values, the mismatch between the actual values and the expected values are reported to an exception processor 80. A test result log processor 82 collects the exception conditions reported to the exception processor 80. The log processor 82 uses the exception conditions as entries in a result log database for facilitating the off-line review of the operation of the application 2 under the control of the test script.

The system 20 further includes an operating system interface 50 for responding to calls made by the script objects 31, and for making calls to the APIs 9. For example, a "Play" function of the script object 31 will instruct the operating system interface 50 to call the "Enum Windows" and "EnumChildWindows" of the operating system 8 to locate or identify the window handle for the desired edit control, and will also instruct the operating system interface 50 to send "SendMessage" and "PostMessage" messages to the window handle just identified by the operating system 8.

In order to initiate the sequence and timing of messages produced by mouse and keyboard events, the operating system interface 50 maintains mouse/keyboard event information corresponding to the mouse and keyboard events. The mouse/keyboard event information includes the series of messages required to simulate mouse and keyboard activity, e.g., WM_SETFOCUS, WM_KEYDOWN, WM_$_{KEYUP}$.

The mouse/keyboard event information is determined using the Microsoft® Windows® Spy++ application or tool marketed by Microsoft Corporation of Redmond, Wash. while manually performing mouse and keyboard events. In the recording mode, the Spy++ tool provides a comprehensive log of messages generated. The log enables the sequence, timing and parameters from mouse and keyboard events to be reconstructed, and maintained by the operating system interface 50 for subsequent use.

The test script developed by the system 20, the selected specification lists 33, and the selected execution input information can be stored on a computer-usable storage medium, such as disk 224 (FIG. 2), for testing a similar application on another SUT (not shown). Alternatively, the test script can be transmitted to the other SUT over a network using the network interface 226.

Figure 3A:
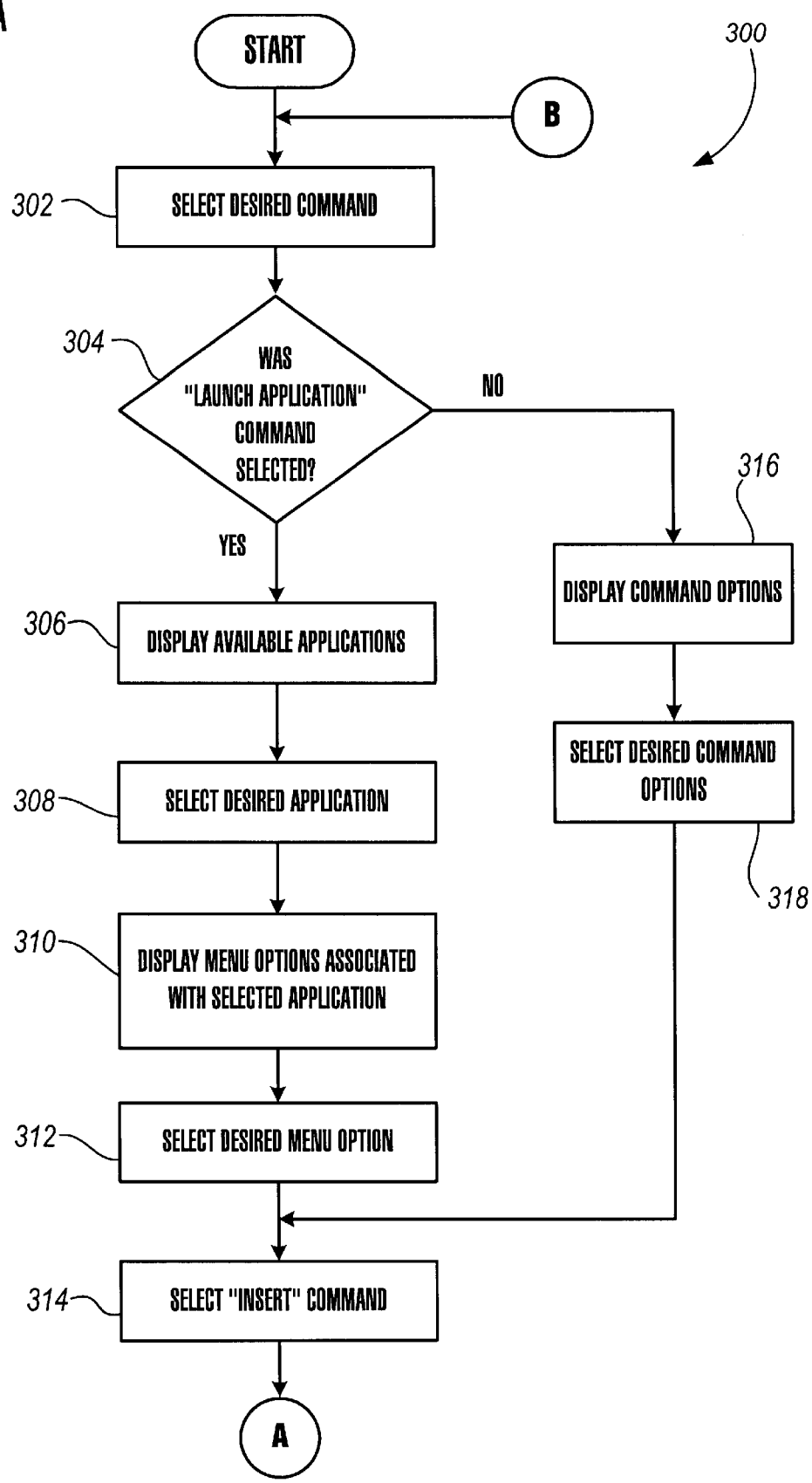
FIGS. 3A–3B is a flowchart illustrating a script development operation of the system of FIG. 1.
Figure 3B:
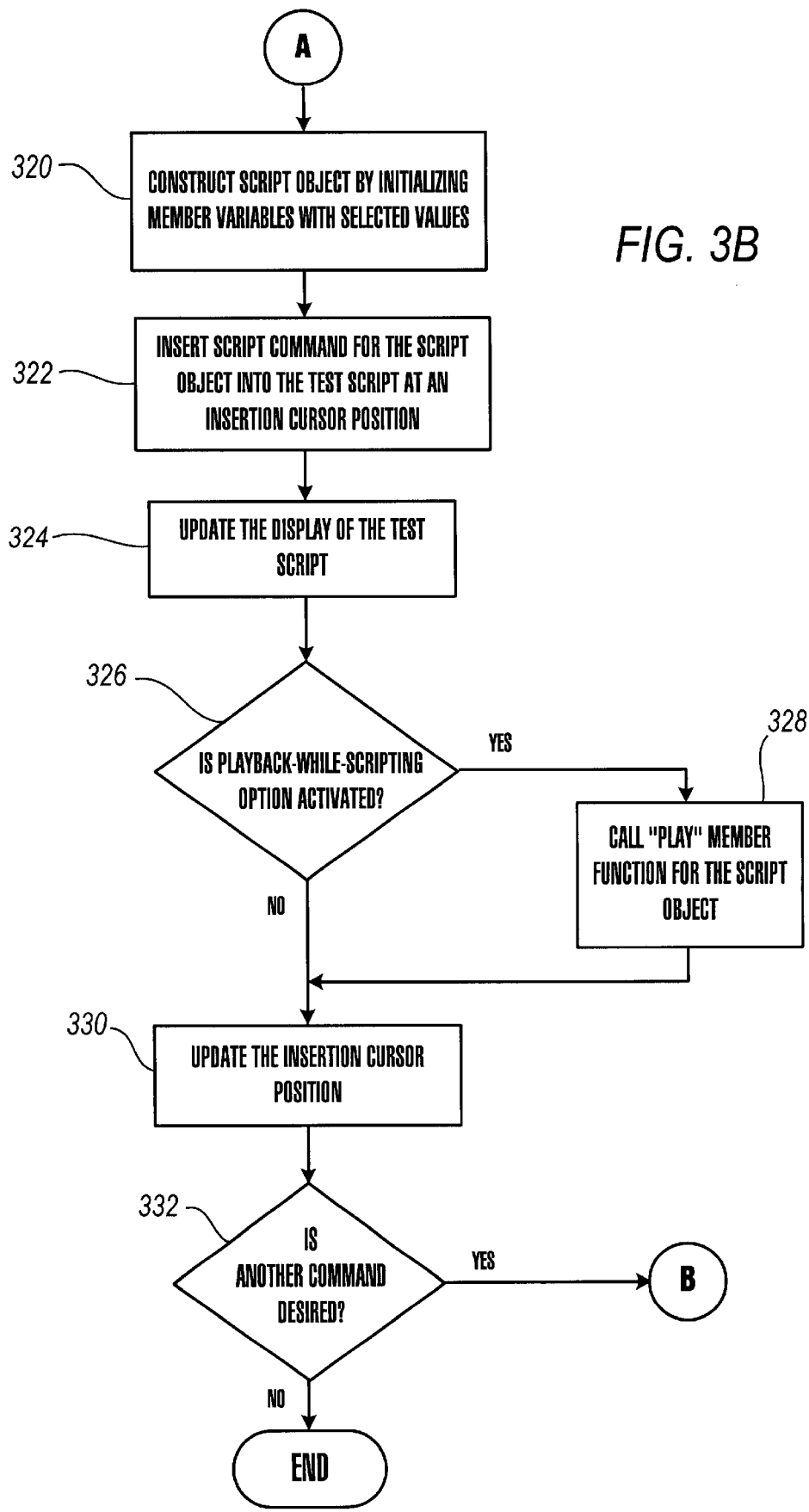

Referring now to FIGS. 3A–3B, there is shown a script development flowchart 300 indicative of the operation of the script editor 21 (FIG. 1) for developing a test script in accordance with the present invention. Initially, a desired command is selected for insertion into the test script at box 302. A determination is made at decision box 304 as to whether the "Launch Application" command was selected.

If the "Launch Application" command was selected, the script editor 21 displays all available applications to be executed at box 306. The user then selects a desired application at box 308, wherein menu options associated with the selected application are displayed at box 310. A desired menu option is selected at box 312 and an "insert" command is selected at box 314 to indicate the user desires to incorporate the selected information in the test script.

When a command other than the "Launch Application" command is selected at decision box 304, command options associated with the selected command are displayed by the script editor 21 at box 316. The desired command options are selected by the user at box 318, and the "insert" command is selected at box 314 to indicate the user desires to incorporate the selected command information in the test script.

Once the "insert" command is selected, a script object is constructed at box 320. The construction of the script object includes initializing member variables with the values selected by the user. For the Launch Application script object, the member variables initialized include: the name of the application to be tested; the name of the application version; the FastPath string that will launch the desired application version when entered into a Main Menu of the SUT 1 (FIG. 1); and the name of the first form expected to be displayed. These values are retrieved from the specification lists 33 (FIG. 1).

At box 322, a script command line corresponding to the script object is inserted into the test script at a position in the test script identified by an insertion cursor. The displayed test script is then updated at box 324.

A determination is made at decision box 326 as to whether the playback-while-scripting mode or option is activated.

When the playback-while-scripting option is activated, a "Play" member function is called for the script object at box 328. If the playback-while-scripting option is not activated, no call to the "Play" member function is made and the insertion cursor position is updated.

Decision box 332 determines whether another command is desired for entering into the test script. Where another command is desired, the new command is selected at box 302. If no further commands are desired, the test script is complete and ready for playback.

Figure 4A:
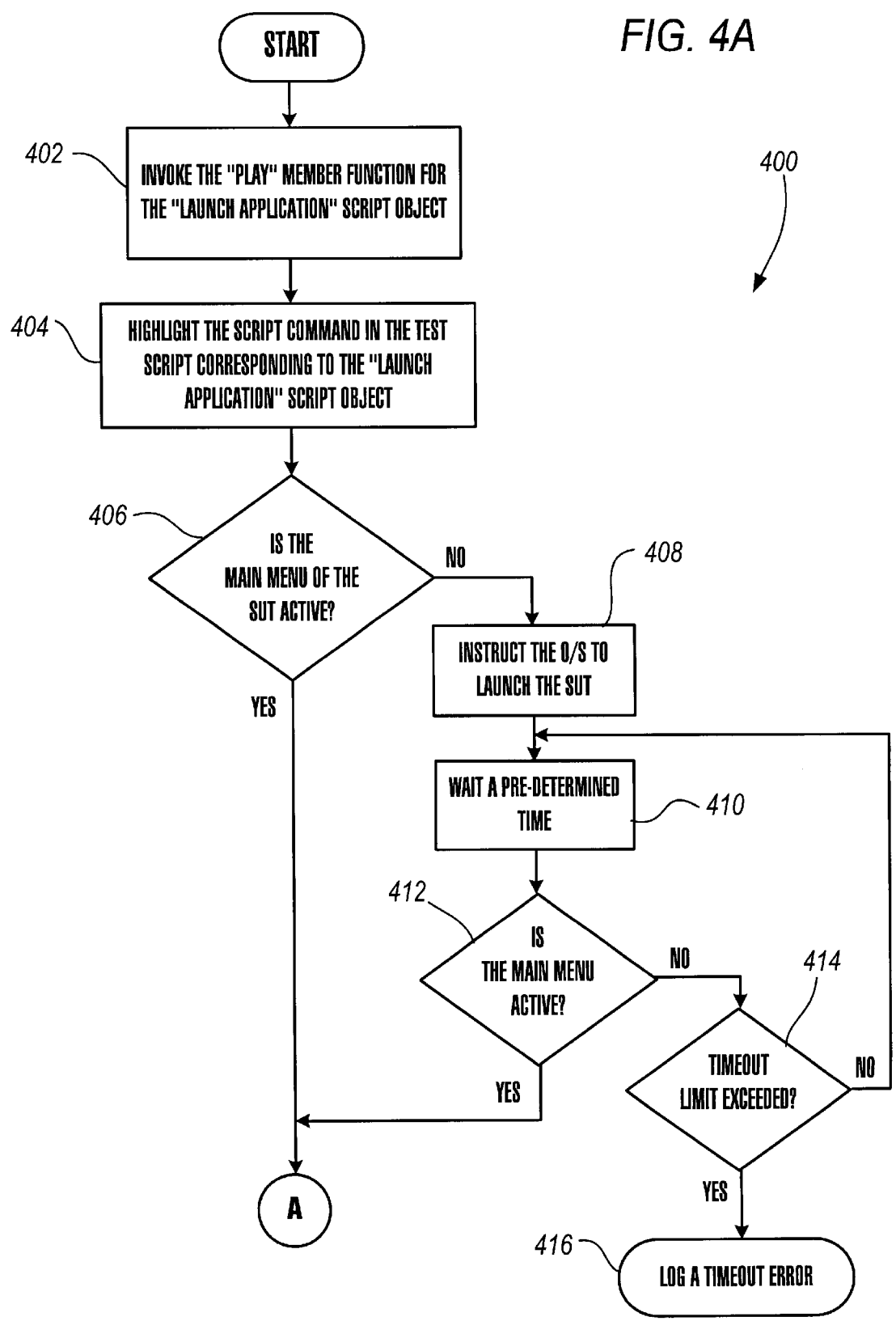
FIGS. 4A–4C is a flowchart illustrating a script execution operation of the system of FIG. 1.
Figure 4B:
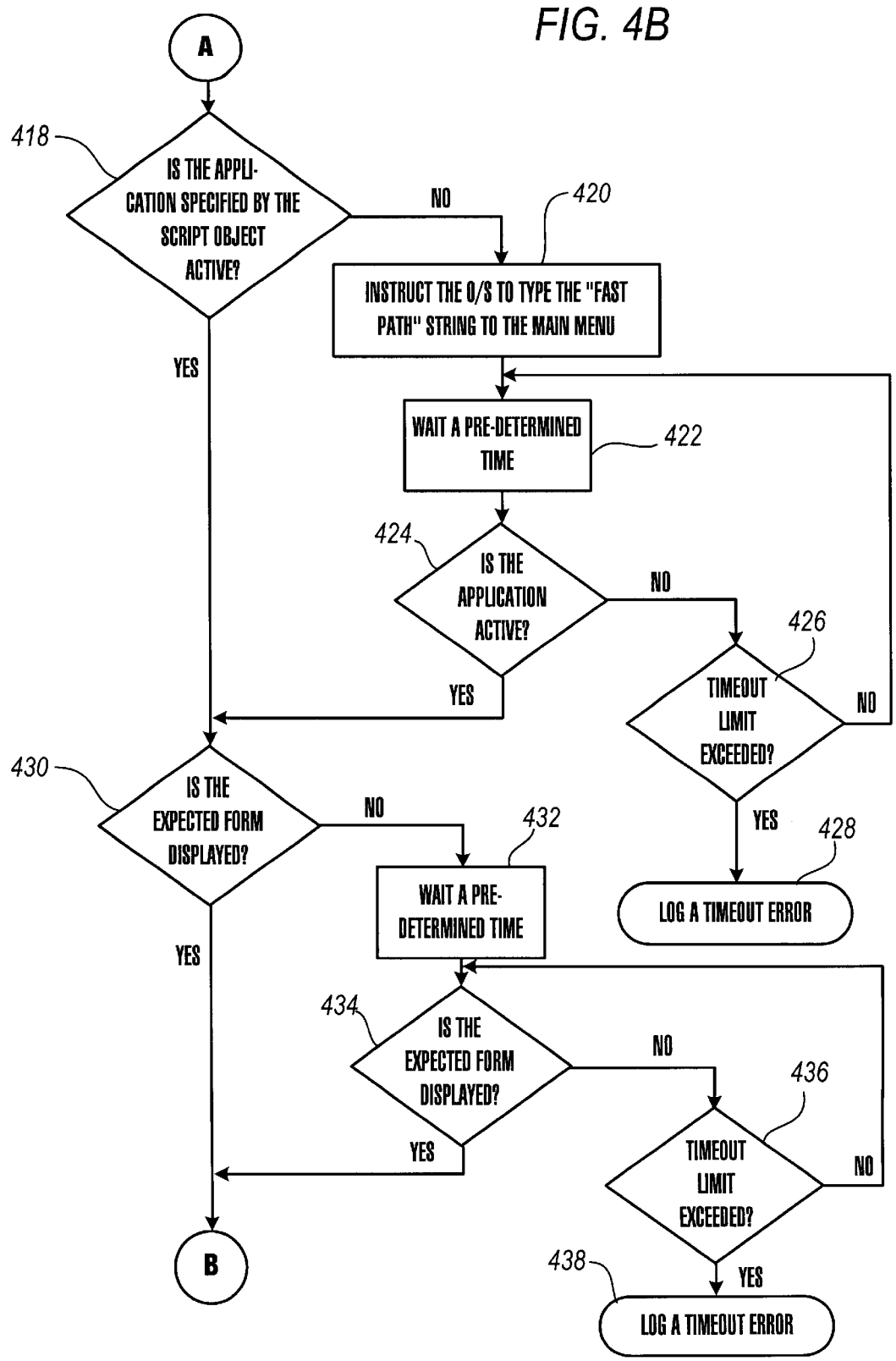
Figure 4C:
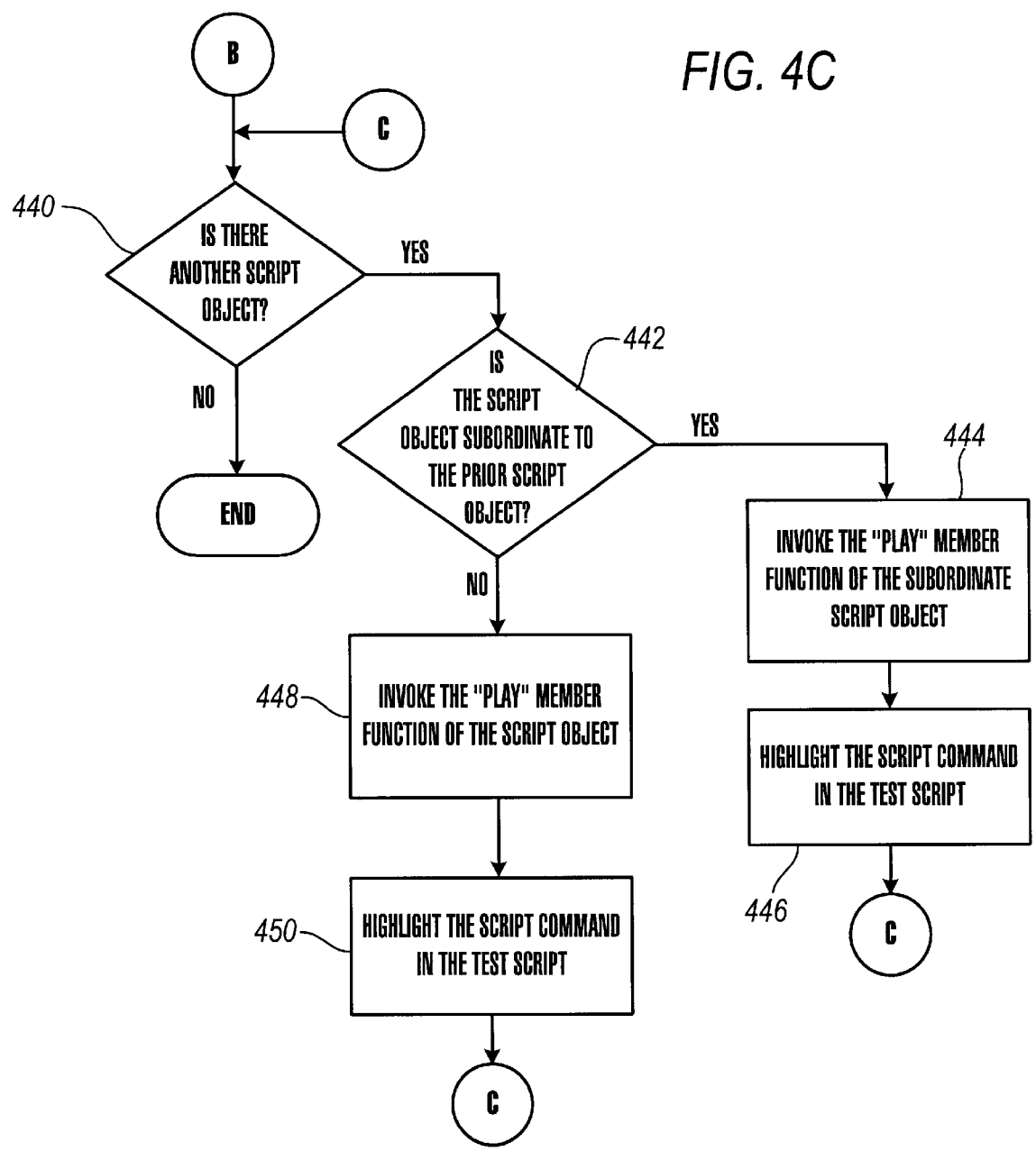

Referring now to FIGS. 4A–4C, there is shown a script playback flowchart 400 indicative of the operation of the script editor 21 (FIG. 1) for playing back a test script to test the application 2 in accordance with the present invention. The playback operation begins by invoking the "Play" member function of the "Launch Application" script object at box 402. The script command in the displayed test script corresponding to the "Launch Application" script object is highlighted at box 404 to visually indicate the progress of the playback operation.

A determination is made at decision box 406 as to whether the Main Menu of the SUT 1 (FIG. 1) is active. If the Main Menu is not active, the operating system is instructed to launch the SUT 1 at box 408. After waiting a pre-determined amount of time as shown at box 410, another check is made at decision box 412 to determine if the Main Menu is active.

If the Main Menu is still not active, a determination is made at decision box 414 regarding the expiration of a timeout limit. Where the timeout limit is not exceeded, another waiting period is undertaken at box 410. When it is determined at decision box 414 that the timeout limit is exceeded, a timeout error is logged at box 416.

In the event the determination made at either decision box 406 or 412 indicates the Main Menu is active, another determination is made at decision box 418 to determine if the application specified in the script object is active. If the application is not active, the operating system is instructed to enter the "FastPath" string into the Main Menu at box 420. After waiting a predetermined amount of time as shown at box 422, another check is made at decision box 424 to determine if the application is active.

If the application is still not active, a determination is made at decision box 426 regarding the expiration of a timeout limit. Where the timeout limit is not exceeded, another waiting period is undertaken at box 422. When it is determined at decision box 426 that the timeout limit is exceeded, a timeout error is logged at box 428.

Following a determination at either decision box 418 or 424 that the application is active, a determination is made at decision box 430 regarding the displayed form. If the expected form is not displayed, a wait of a pre-determined amount of time is initiated at box 432. Another check is made at decision box 434 to determine if the expected form is displayed.

If the expected form is still not displayed, a determination is made at decision box 436 regarding the expiration of a timeout limit. Where the timeout limit is not exceeded, another check is made regarding the display of the expected form at decision box 434. When it is determined at decision box 436 that the timeout limit is exceeded, a timeout error is logged at box 438.

Upon determining the expected form is displayed at either decision boxes 430 or 434, a determination about the existence of another script object is made at decision box 440. If there are no more script objects, the playback of the test script is complete.

The playback operation of the script editor 21 (FIG. 1) further enables the playing back of the test script according to the hierarchical arrangement of script commands. In this regard, the test script is arranged in a tree format. Consequently, script commands in a particular branch will be subordinate to the script command defining the node for the branch. Other script commands may have a parallel relation to other script commands. The playback operation of the present invention permits all subordinate script commands of a branch to be completed before parallel script commands are operated on.

To facilitate this playback operation, the determination that another script object exists at decision box 440 requires a determination to be made at decision box 442 regarding the relationship of the new script object relative to the prior script object. If the new script object is subordinate to the prior script object, the "Play" member function of the subordinate script object is invoked at box 444 and the corresponding script command in the test script is highlighted at box 446. Subsequently another determination is made at decision box 440 to determine if there are additional script objects. This pattern is repeated for all subordinate script objects in a node.

If the additional script object is determined to be a parallel script object at decision box 442, the "Play" member function of the new script object is invoked at box 448 and the corresponding script command in the test script is highlighted at box 450. Another determination is then made at decision box 440 as to whether additional script objects exist. As a result of the playback operation described above, the script objects of a particular branch will be executed before the script objects of a subsequent, but parallel branch.

Referring now to FIGS. 5–15, the development of an exemplary test script for simulating user input to the application 2 (FIG. 1), such as an Accounts Payable (A/P) Standard Voucher Entry application, is illustrated wherein the test script is created by the script editor 21 (FIG. 1) in accordance with the present invention. The A/P Standard Voucher Entry application is one of the applications contained in the One World™ suite of application programs marketed by J. D. Edwards & Company of Denver, Colo. As will be described in greater detail, the A/P Standard Voucher Entry application utilizes one or more forms, such as a Supplier Ledger Inquiry form and an Enter Voucher-Payment Information form, to enable the user to browse, enter and/or modify business information. Although the A/P Standard Voucher Entry application is described for purposes of illustration, test scripts for other applications can be developed in a similar manner.

Figure 5:
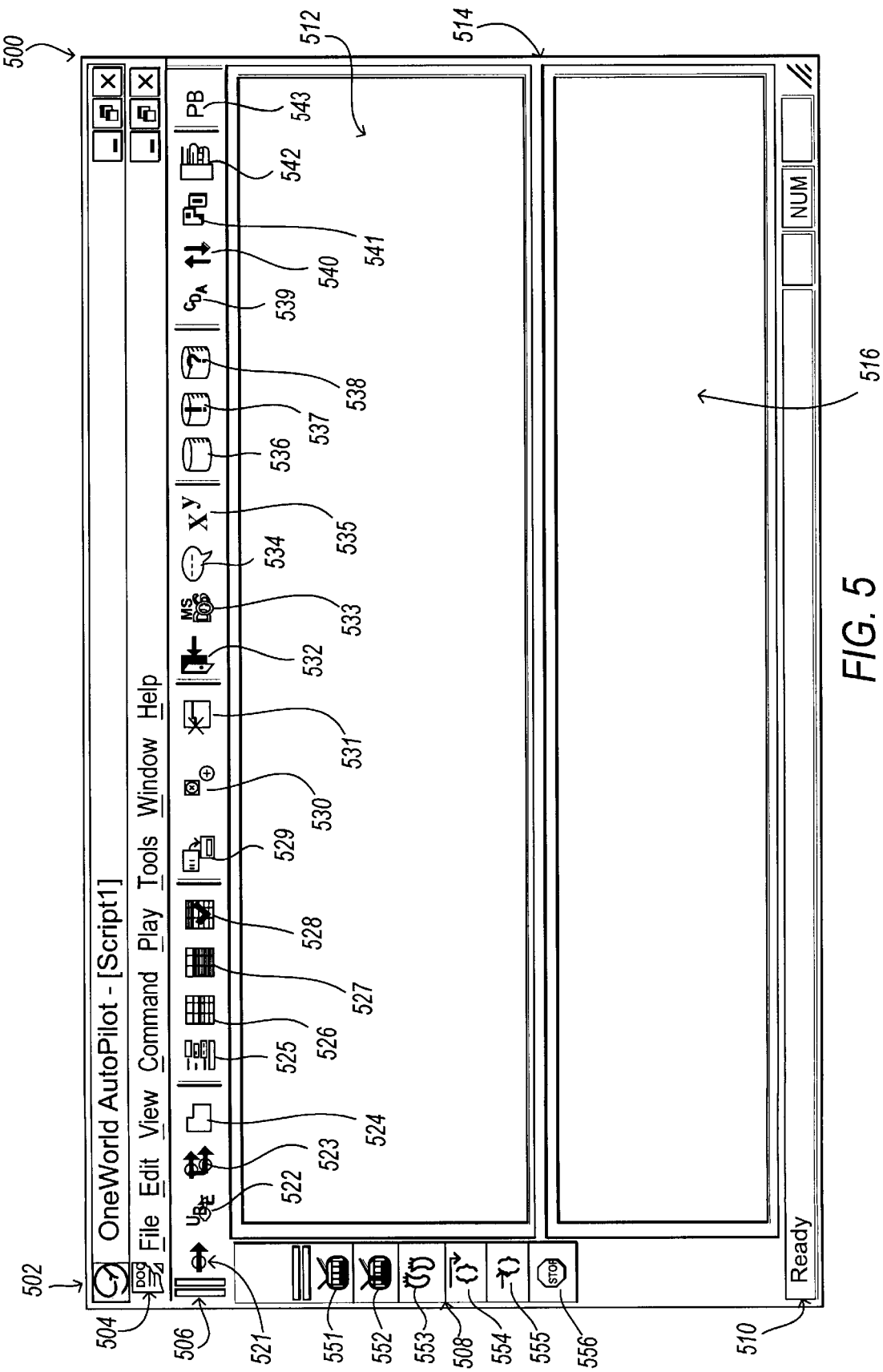

Considering now the development of a test script to add an entry to the business information using the A/P Standard Voucher Entry application in greater detail with reference to FIG. 5, there is shown a script editor window 500 of the script editor 21 (FIG. 1) that enables the user to develop the test script. The script editor window 500 includes a caption bar 502, a menu bar 504, a cool bar 506, a playback cool bar 508 and a status bar 510 for selecting and entering commands and actions for the test script as will be described in greater detail below. To facilitate the customization of the window 500 according to the preferences of the user, the cool bar 506 and playback cool bar 508 can be moved about the window 500 using a conventional click and drag operation.

The script editor window 500 further includes a command pane 512 separated from a script pane 516 by a splitter bar 514. The command pane 512 is operable to display lists of information for enabling the user to select desired information for use in the test script to execute a desired application, such as the Standard Voucher Entry application. The lists can either be populated or unpopulated. A populated list presents the user with a selection of predetermined choices while an unpopulated list requires input by the user.

The script pane 516 displays the test script, including command lines. The command lines express, in words and symbols, either the context in which a command is to be executed, or the action that is to be taken in the chosen context. As described in greater detail below, the command lines are visual representations of script objects that control the operation of the application 2 (FIG. 1).

The cool bar 506 includes a group of buttons representing options for scripting context or action commands, including: a launch application button 521; a universal batch engine button 522; an application interconnect button 523; a processing options button 524; a header detail button 525; a grid column button 526, query by example (QBE) button 527; a grid detail button 528; a form exit button 529; a checkbox button 530; a confirm form button 531; an exit application button 532; a command line button 533; a wait button 534; a define variable button 535: a create database validation button 536; an associate database validation button 537; an execute database validation button 538; a UBE sequencing button 539; a UBE sorting button 540; a UBE processing options button 541; a print button 542; and a playback button 543. By activating the playback button 543 a playback mode is invoked and the test script can be executed as it is developed to permit the user to see the resulting operation of the application 2 (FIG. 1) substantially simultaneously with the entry of command lines in the test script. The options provided by buttons 521–543 are also available from the menu bar 504.

In addition to the playback option provided by the playback button 543, the playback cool bar 508 contains a group of playback option buttons, including: a play from top button 551; a play from cursor button 552; a step on button 553; a next step button 554; a continue to breakpoint button 555; and a stop playback button 556. The buttons 551–556 facilitate executing the test script in a controlled manner.

Figure 6:
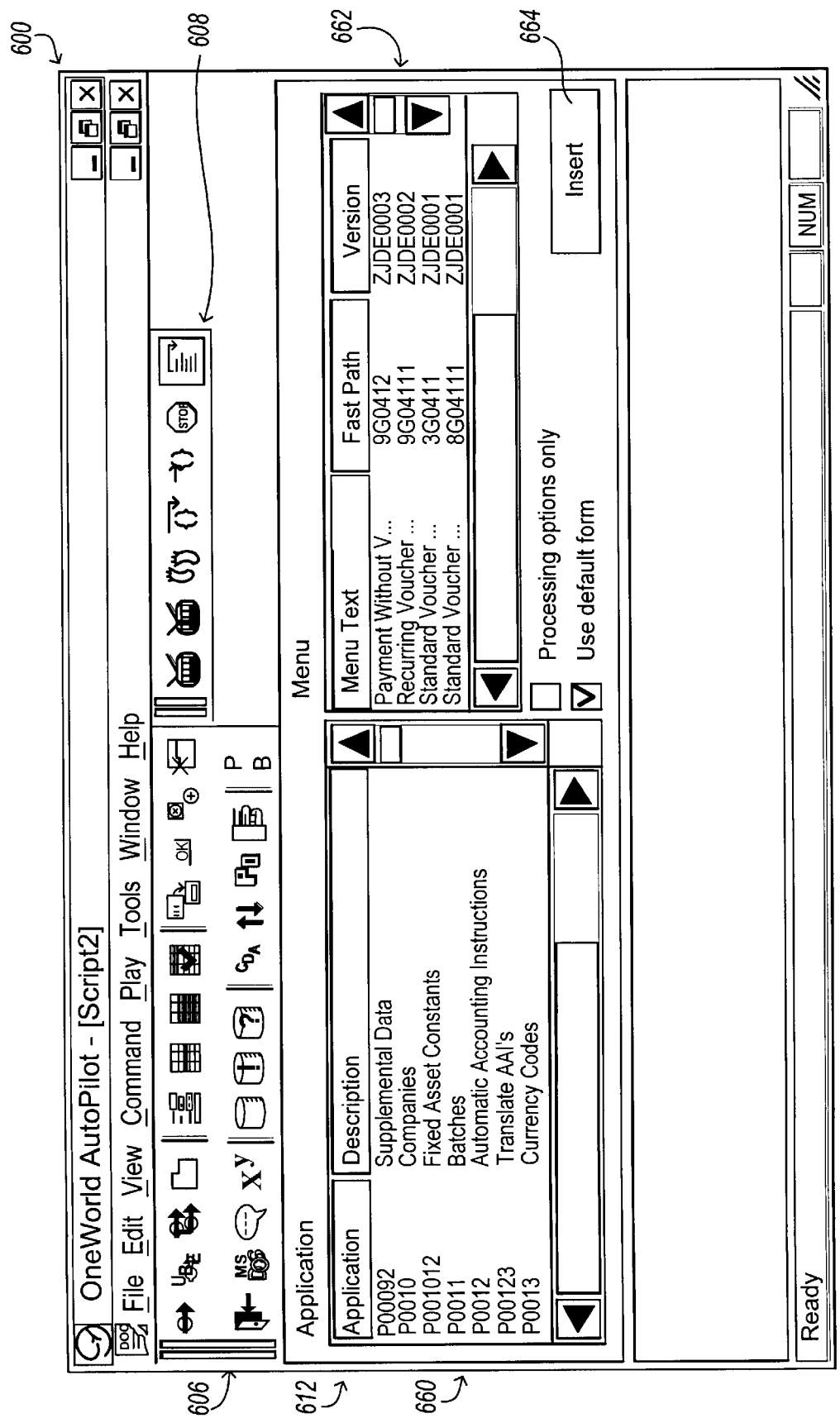

Selecting the launch application button 521 initiates the creation or development of the test script, and results in the display of script editor window 600 (FIG. 6). Script editor window 600 is substantially similar to the script editor window 500 and includes a cool bar 606, a playback cool bar 608 and a command pane 612. The cool bar 606 and playback cool bar 608 are repositioned on window 600 relative to the position of cool bar 506 and playback cool bar 508 on window 500, however the bars 606 and 608 could remain in the same position as bars 506 and 508 in window 500.

Command pane 612 includes a pair of populated list panes, including an application list pane 660 and a menu list pane 662, and an insert button 664. The application list pane 660 is populated with application identifier and description information obtained from the application configuration information maintained by the design tool tables 4(FIG. 1) for all application programs in the application suite. The menu list pane 662 is populated with menu text information, access or fast path information and version information obtained from the application configuration information for all forms and interactive versions available for the applications identified in application list pane 660. The menu text information provides a written description of an application. The fast path information correlates to a specific identifier for a particular form for quickly retrieving the form. The version information relates to processing options that are executed when a particular application is started. In order to view all of the contents of the application list pane 660 and the menu list pane 662, the panes 660 and 662 include conventional scrolling features.

Once the user makes desired selections from the command pane 612, the user activates the insert button 664 to generate test script information using the application specification information corresponding to the selections made in panes 660 and 662 of the command pane 612. The user selections are described in more detail with reference to FIG. 7 below.

Figure 7:
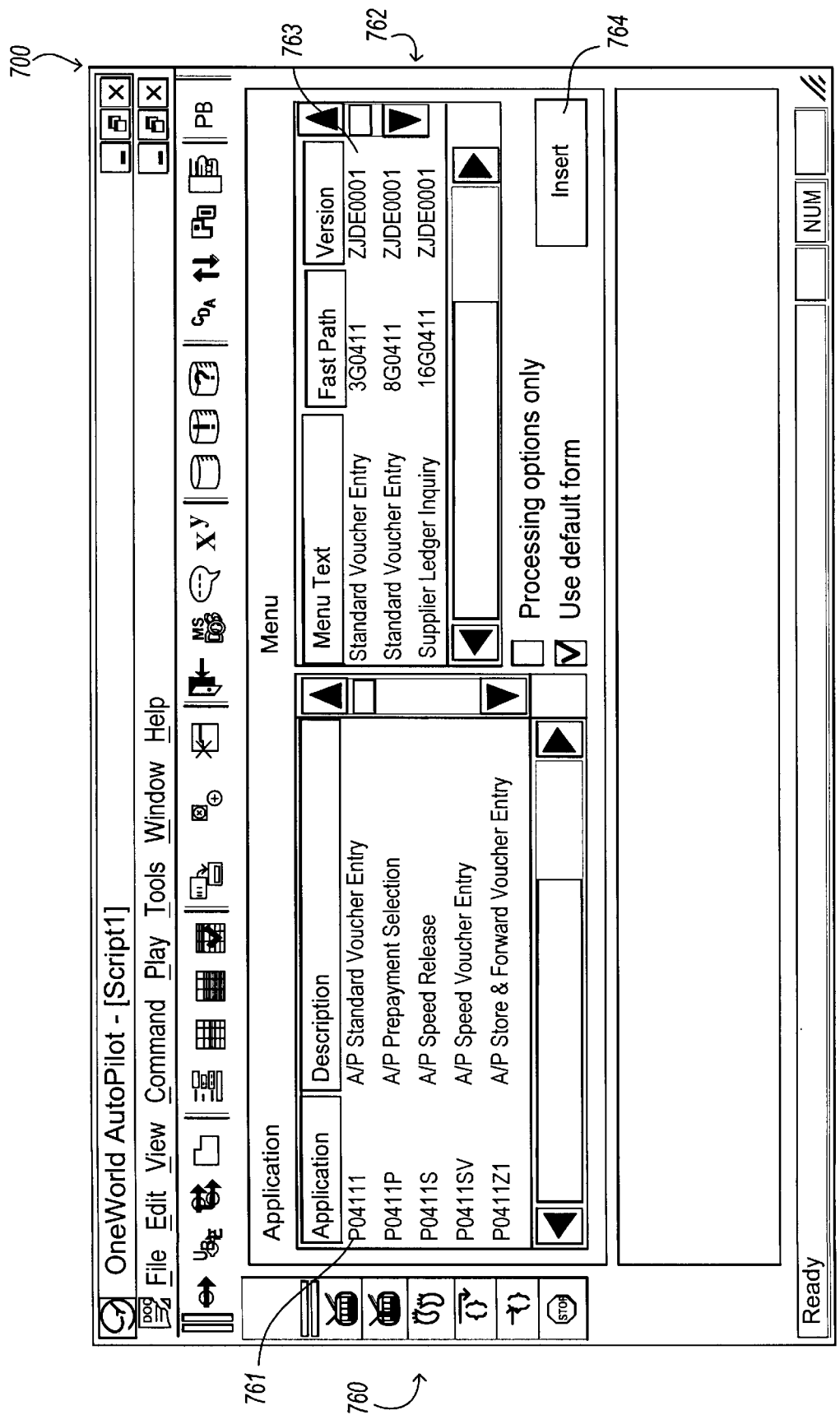

As shown in FIG. 7, a script editor window 700 includes a populated application list pane 760. The user may scroll through the application list pane 760 from the initial list pane 660 (FIG. 6) to select a desired application by focusing or highlighting the desired application using the pointing device 212 (FIG. 2). In the present example, application information item 761 is highlighted from the list pane 760 to indicate the user's desired selection of the A/P Standard Voucher Entry application identified by the alpha-numeric code P0411.

Upon the focusing or highlighting of the application information item 761, the menu list pane 662 (FIG. 6) is re-populated and updated with menu description information, fast path information and version information for forms specifically associated with the selected application information item 761. Updated menu list pane 662 (FIG. 6) is shown as menu list pane 762 in FIG. 7. The forms specifically associated with the selected application information item 761 are determined by the application configuration information. The automatic updating of the pane 762 facilitates the selection of proper form description information associated with the selected application information item 761 as the user is not required to know which form description information is associated with the selected application information item.

Subsequently, the user can focus on or highlight a desired menu description item, such as menu description item 763 entitled Standard Voucher Entry, from the menu list pane 762. This selected menu description item 763 provides the fast path information "3G0411" for an initial form that functions as entry point to the application, where "3G0411" corresponds to a Supplier Ledger Inquiry form. When the user is satisfied with the selected application information, the user activates the insert button 764 to develop the test script corresponding to the selections made in the list panes 760 and 762.

After activating the insert button 764, a modifiable test script 870 (FIG. 8) is displayed in a script pane 816 of script editing window 800. In the present example, the playback mode is invoked to permit the A/P Standard Voucher Entry application to be executed substantially concurrently with the development of the test script, such as the test script 870. The execution of the A/P Standard Voucher Entry application resulting from activating the insert button 764 is shown in FIG. 9, and will be discussed in further detail below.

The test script 870 includes a group of command lines 871–874 arranged in a hierarchy or tree, and further includes an insertion cursor 875. The command lines 871–874 correspond to the script objects 31 (FIG. 1), wherein the script objects 31 cause the command lines 871–874 to be displayed in the script pane 816 with textual and graphical information.

Each of the command lines 871–874 expresses either the context in which a command is to be executed (a "context command"), or the action that will be taken in a chosen context (an "action command"). Context commands define nodes of the test script 870, while action commands must be attached to a context command. This hierarchical arrangement facilitates the execution of all actions within the same node before actions within another node are completed, and also facilitates executing the actions within a node for a pre-determined number of repetitions. Control is passed through the test script 870 according to the hierarchy, from the highest level node down to the lowest level node.

Command line 871 defines the highest level node and includes a context command ("Begin Script"). The command line 871 also includes text indicating the number of times the node is to be executed ("Repeat Count").

Command line 872 defines a second level node dependent upon the highest level node of command line 871, and includes a context command ("Application"). The command line 871 further includes application information corresponding to the application list item 761 (FIG. 7) and repeat count information ("Repeat Count").

Command line 873 includes an action command ("Type Fast Path") and a specific entry ("3G0411") for utilizing a fast path access method to launch the Standard Voucher Entry application as selected in menu list item 763 (FIG. 7). In this regard, the One World™ suite of application programs permits a user to input or type a shorthand fast path entry to quickly launch a desired application corresponding to that fast path entry.

Command line 874 includes a context command ("Form") and defines a third level node dependent upon the second level node, or command line 872. The command line 874 also includes the name of the initial or entry point form ("Supplier Ledger Inquiry") for the A/P Standard Voucher Entry application as determined by the application configuration information and the fast path entry identified in menu list item 763 (FIG. 7), and repeat count information ("Repeat Count").

The insertion cursor 875 is initially positioned below the lowest level node and indicates the location in the test script 870 where a new command line will be inserted. The insertion cursor 875 can be repositioned to insert a new command line in a different location by focusing or highlighting a command line directly above the location where the new command line is desired.

In the playback mode, the execution of the A/P Standard Voucher Entry application under the control of the test script 870 (FIG. 8) can be observed as the test script 870 is being developed. Referring now to FIG. 9, there is shown an application execution window 900 as determined by the test script 870 (FIG. 8). The application execution window 900 includes an application window 901 corresponding to the A/P Standard Voucher Entry application and a form window 902 corresponding to the Supplier Ledger Inquiry form, the entry point form for the application. The Supplier Ledger Inquiry form is a find/browse type of form and modifications or additions to the business information cannot be made directly from this form window 902.

To enable the user to add an entry to the business information, another form must be used. The form window 902 includes a group of buttons 903 including an add button. In order to cause the add button to be activated, the user can select a form exit button 829 (FIG. 8) to script the action in the test script. After selecting the form exit button 829, the script editor window 800 is updated as script editor window 1000.

Figure 8:
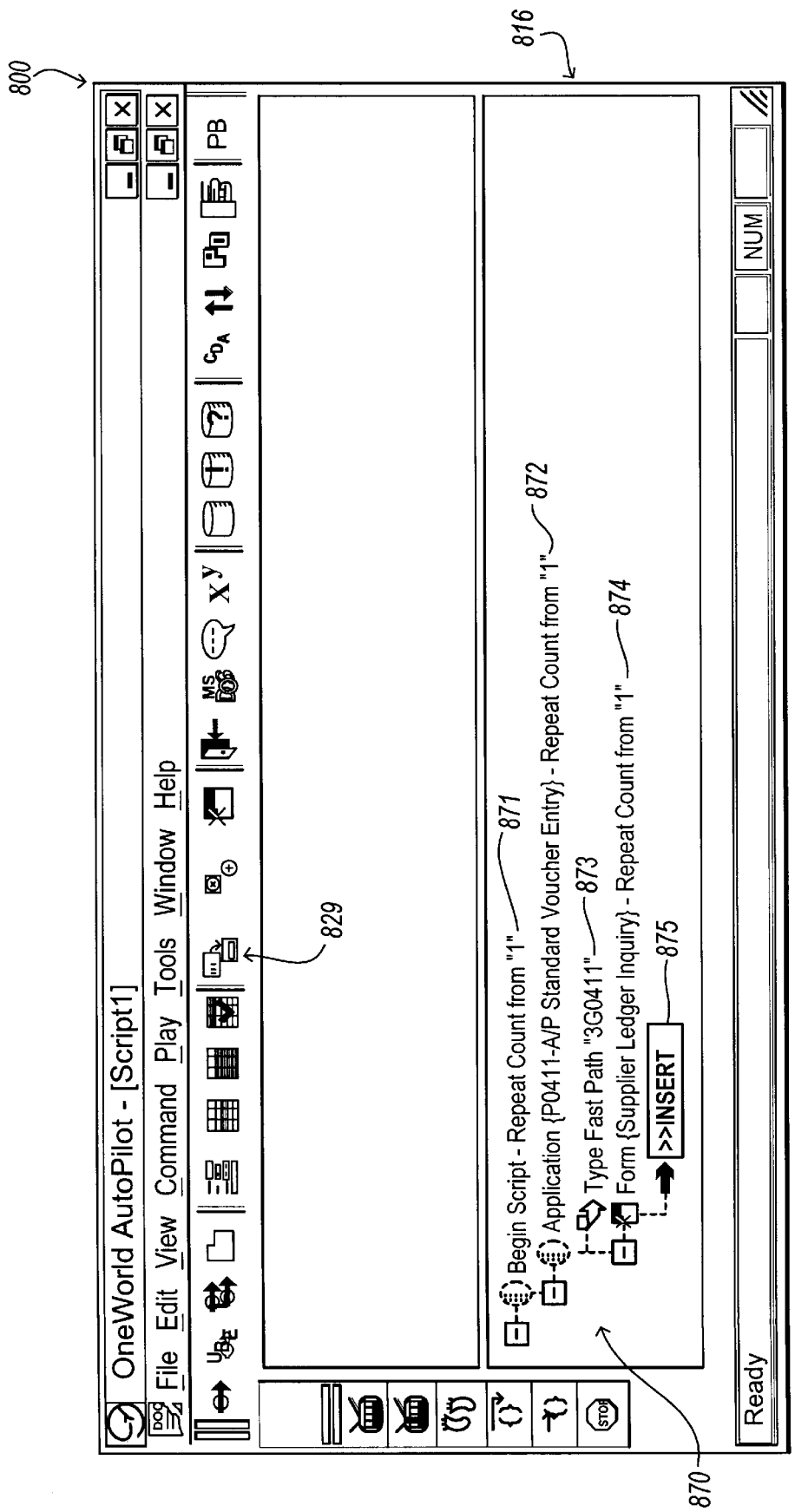
Figure 9:
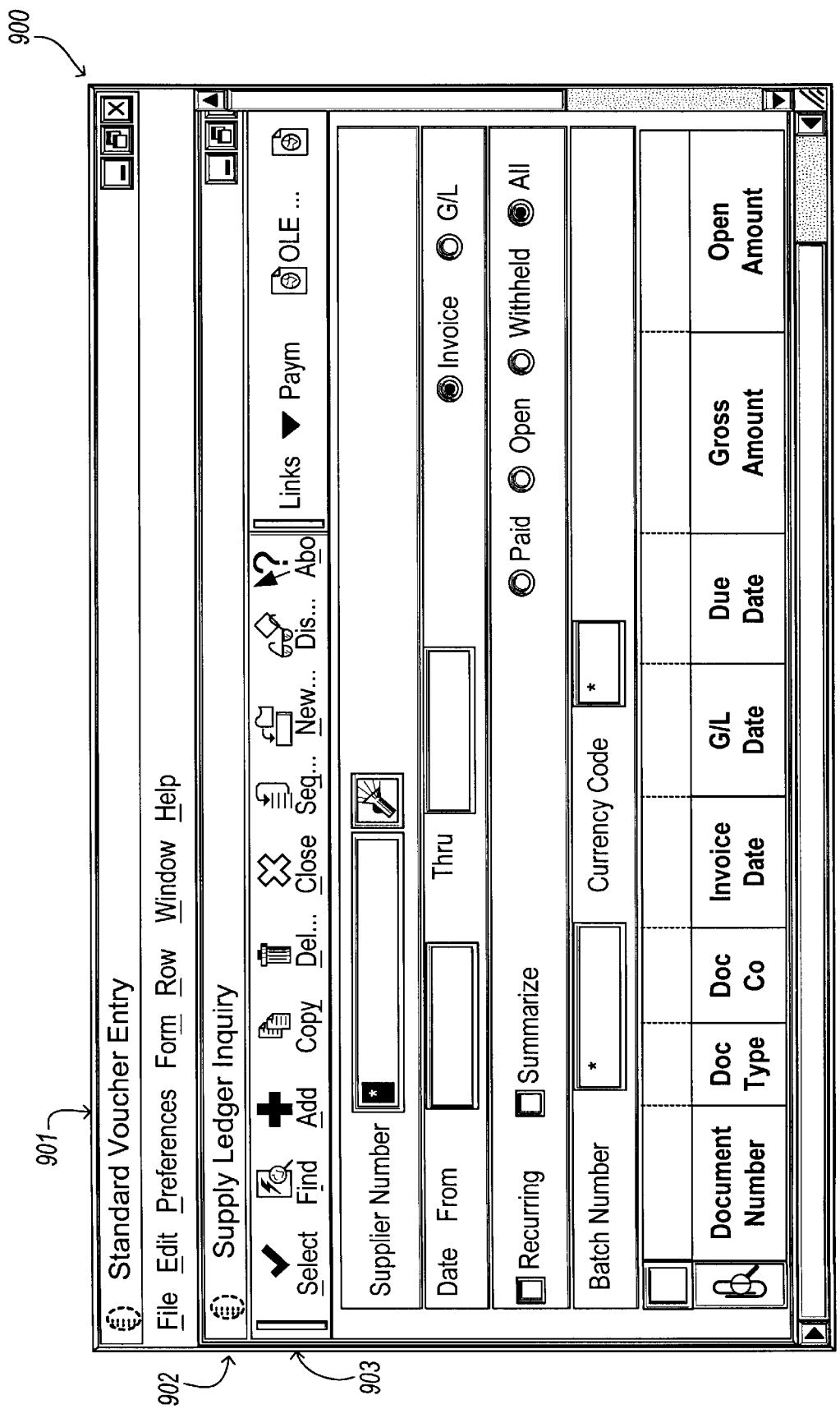
Figure 10:
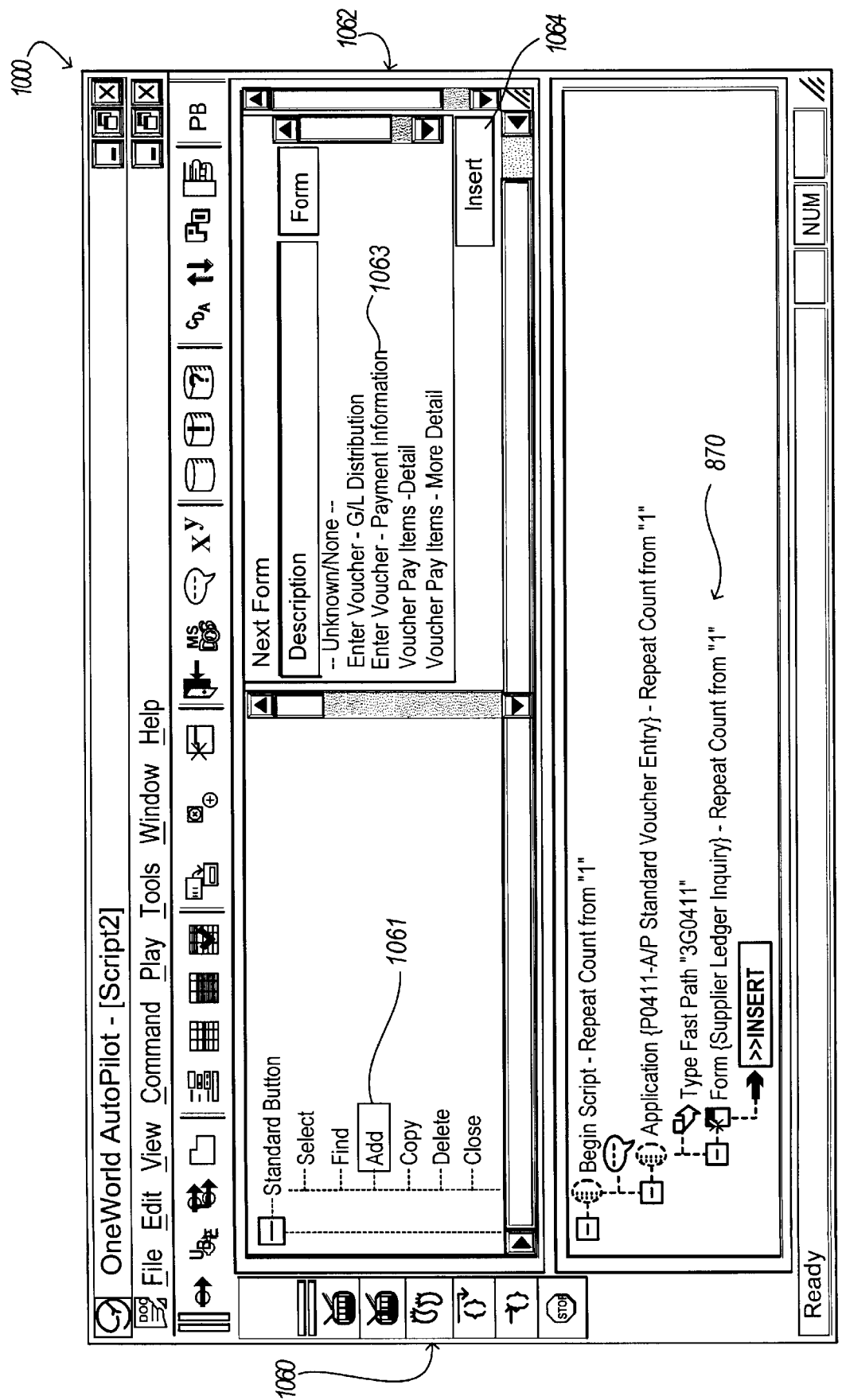

Script editor window 1000 includes a button list pane 1060 and a form list pane 1062, and also displays the test script 870 (FIGS. 8 and 10). The button list pane 1060 includes a group of button function items, including an add button function item 1061, corresponding to the Supplier Ledger Inquiry form identified in command line 874 (FIG. 8). By focusing or highlighting the add button function item 1061, the form list pane 1062 is populated with next form information indicating the names of forms associated with the Supplier Ledger Inquiry form, including form name item 1063 indicative of an Enter Voucher-Payment Information. Selecting the form name item 1063 and subsequently activating the insert button 1064 updates the test script 870 (FIGS. 8 and 10) to test script 1170 (FIG. 11) of script editor window 1100.

Figure 11:
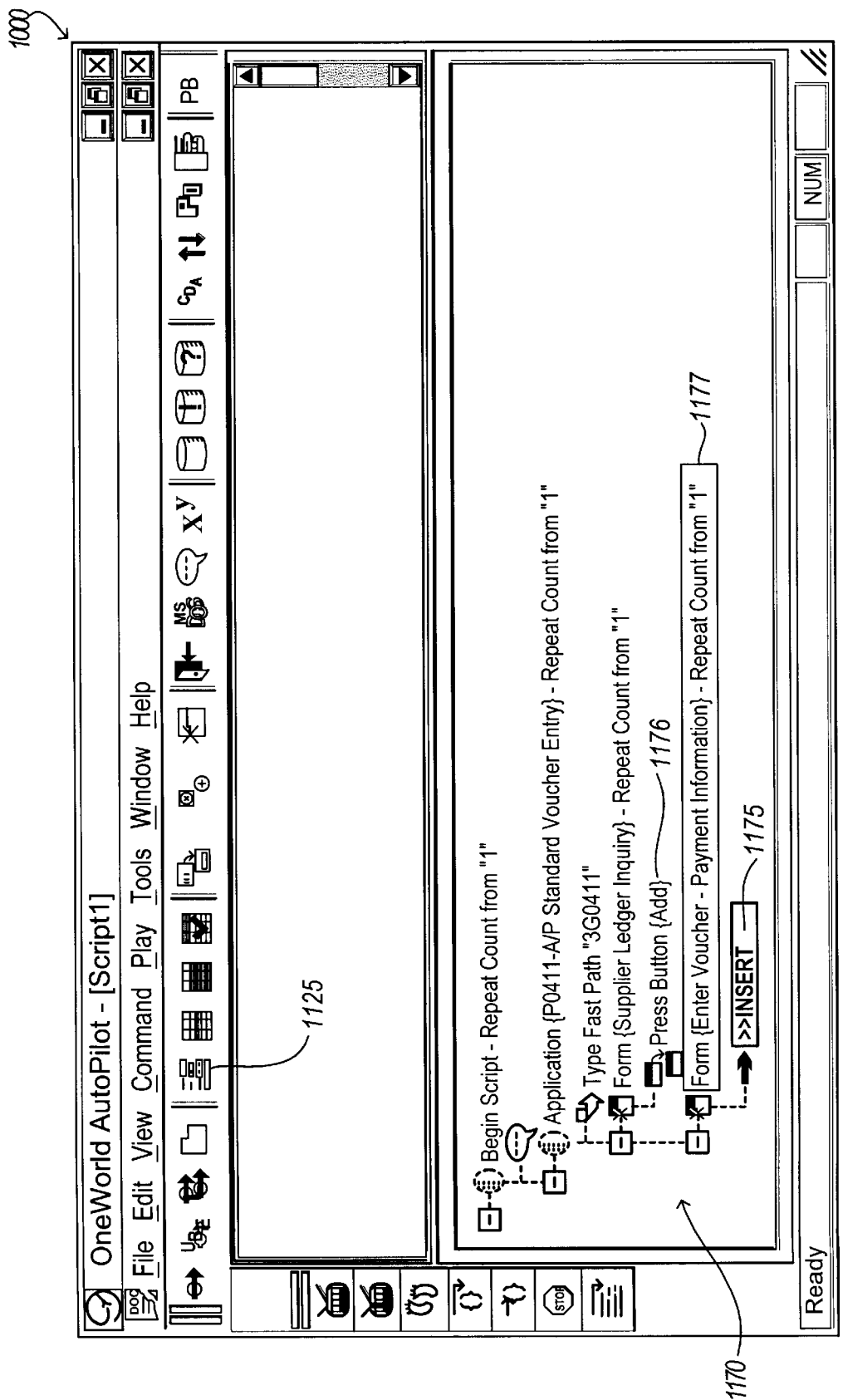

As shown in FIG. 11, test script 1170 includes command lines 1176 and 1177 inserted at the position indicated by the insert cursor 875 (FIG. 8) below the command lines 871–874 of test script 870 (FIGS. 8 and 10 ). Command line 1176 includes an action command ("Press Button") that is dependent upon the context command of command line 874 (FIG. 8), and identifies a specific button function name ("Add") to be executed.

Command line 1174 includes a context command ("Form") and is on the same hierarchical level as the command line 874. The command line 1174 also includes the name of the form selected as the next form item 1063 (FIG. 10) ("Enter Voucher-Payment information"), and further includes repeat count information ("Repeat Count"). The addition of the command lines 1176 and 1177 causes the insertion cursor 1175 to be repositioned below command line 1177.

The execution of command lines 1176 and 1177 results in application execution window 1200 (FIG. 12) being displayed. Application execution window 1200 includes application window 1201 corresponding to the Standard Voucher Entry application and form window 1202 corresponding to the Enter Voucher-Payment Information form. Form window 1202 includes a number of data entry fields, including data entry field 1203 for company number.

In order to script the entry of data into data entry field 1203, the user selects a header detail button 1125 (FIG. 11). Upon selecting the header detail button 1125, a script editor window 1300 (FIG. 13) is displayed. The script editor window 1300 includes a command pane 1306 having a header control pane 1360 and an input source pane 1362. The header control pane 1360 is populated by a group of header items corresponding to the data entry fields of the window 1202 (FIG. 12), including header item 1361 ("Company").

Figure 12:
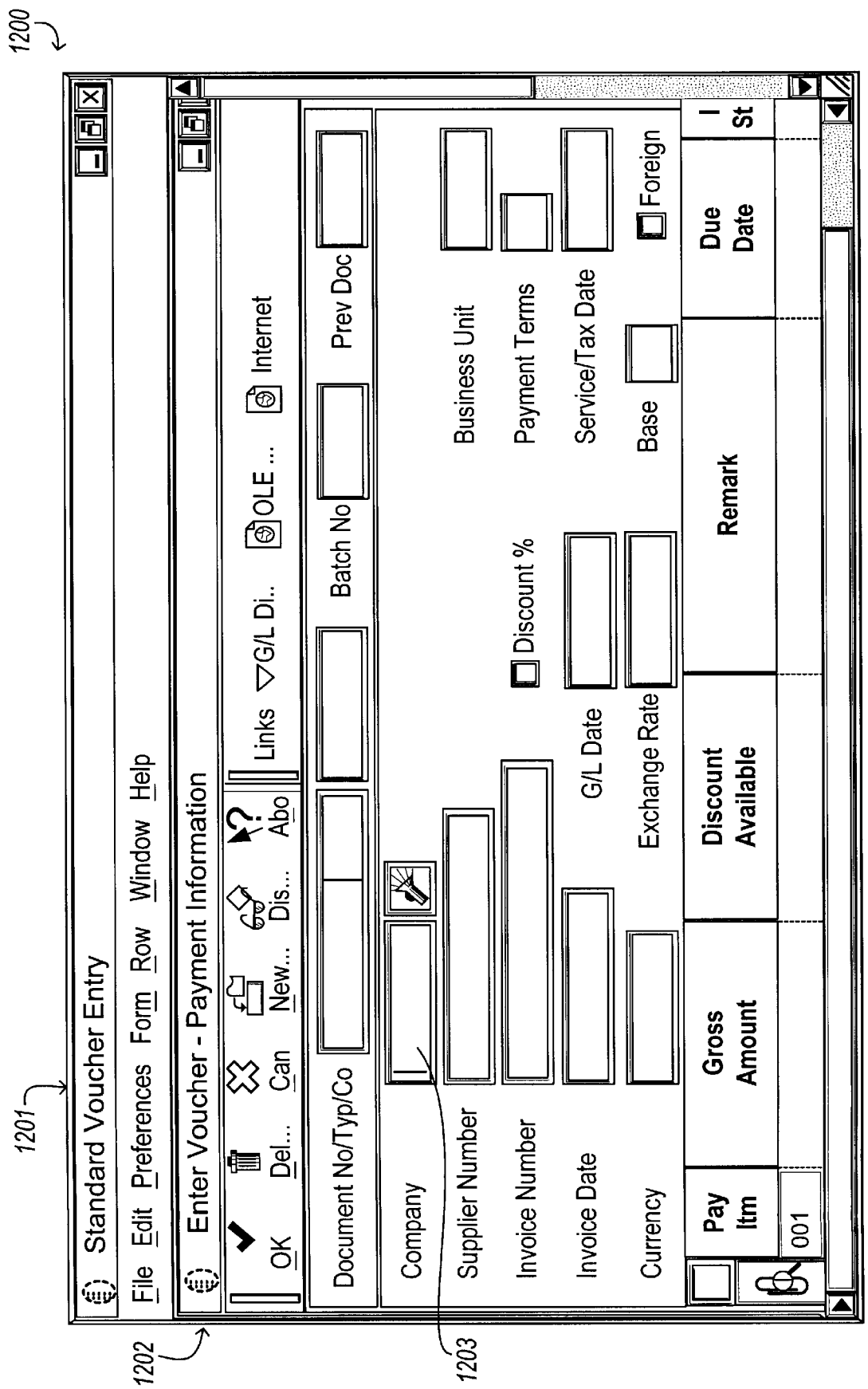
Figure 13:
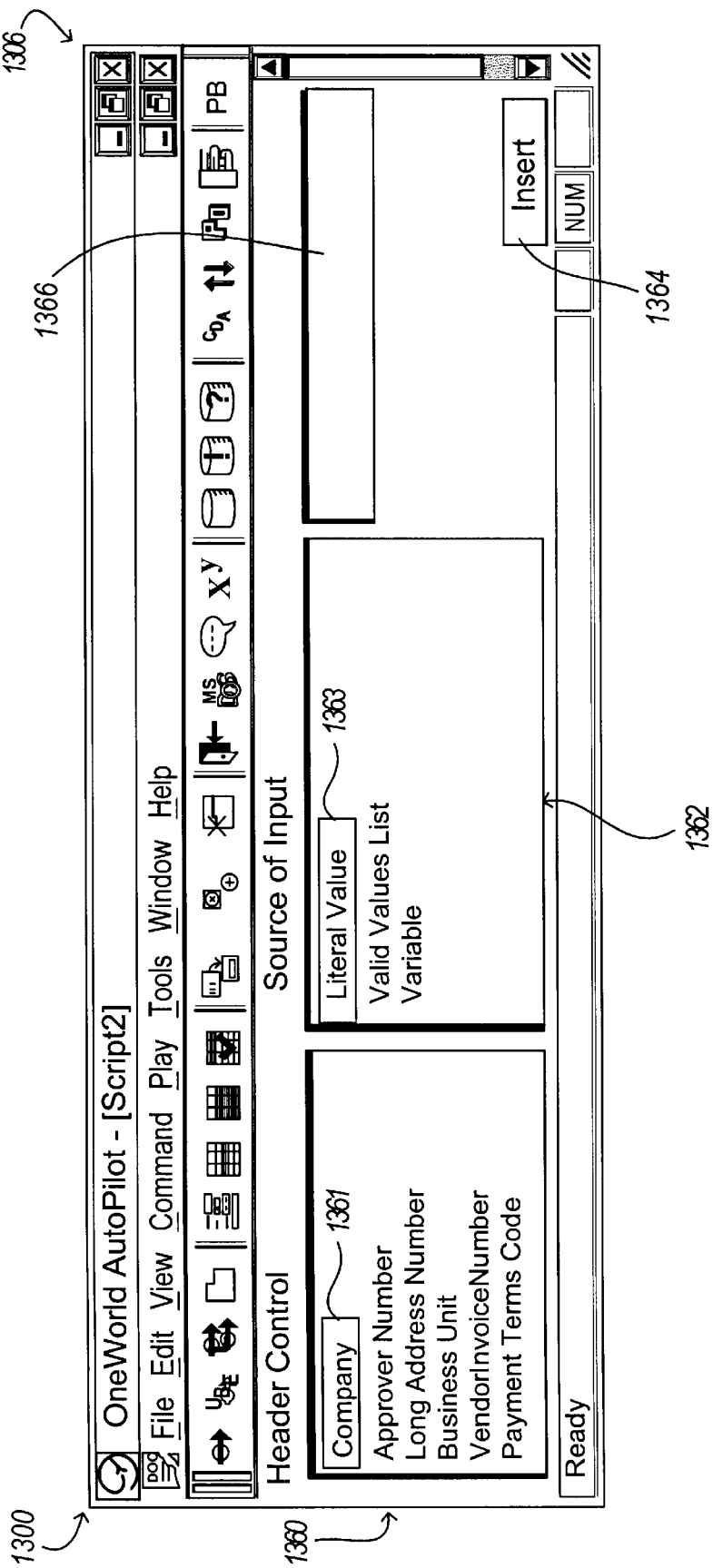

Selecting the header item 1361 populates the input source pane 1362 with a group of source items, such as source item 1363 ("Literal Value"). The selection of source item 1363 enables a literal value to be entered into a literal value pane 1366 for defining the input to the data entry field 1203 (FIG. 12). In this example, an input value of "1" is selected. When satisfied with the selections, the user activates the insert button 1364 to develop the corresponding portion of the test script.

Figure 14:
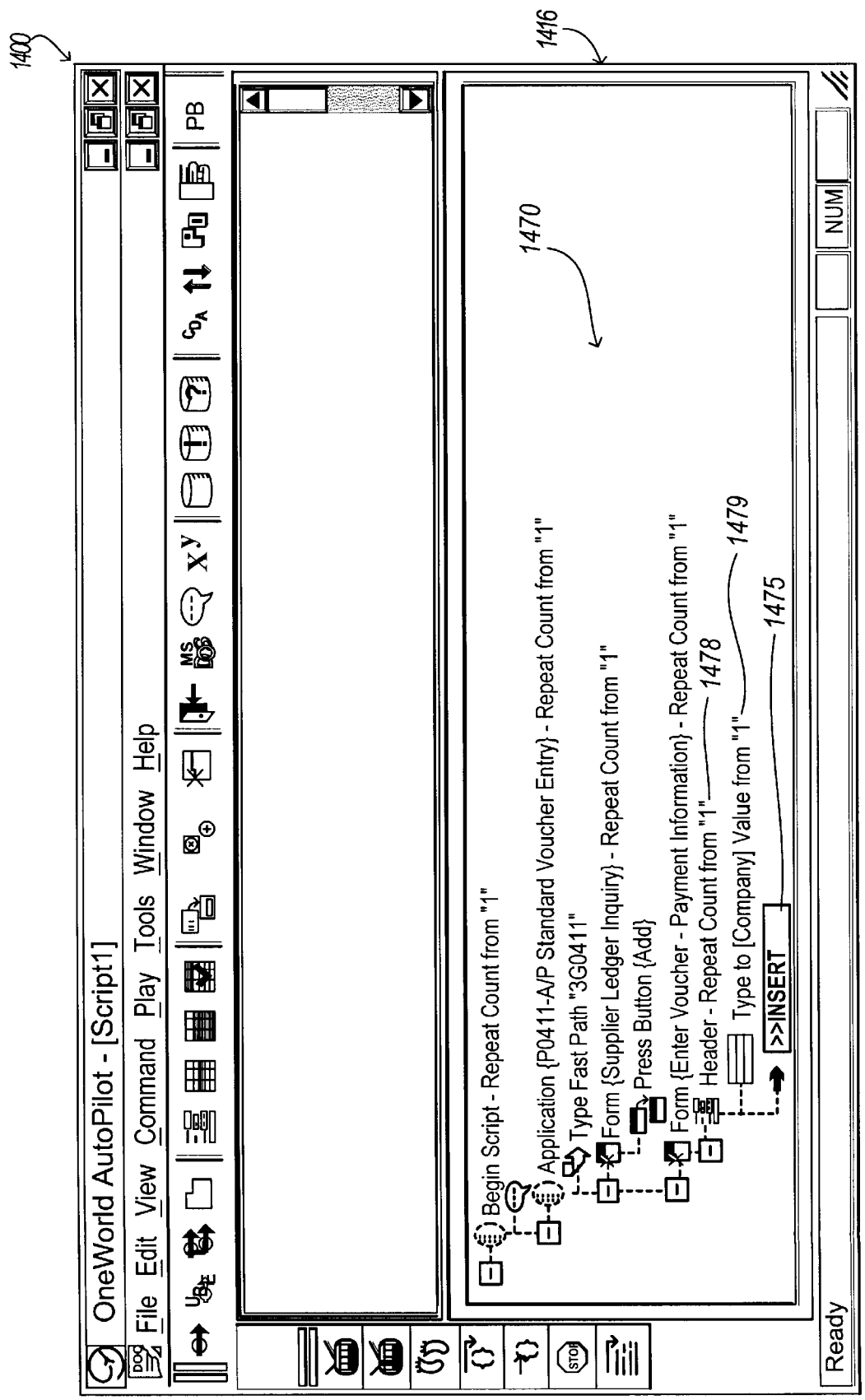

As shown in FIG. 14, the activation of the insert button 1364 (FIG. 13) updates the test script 1170 (FIG. 11) to test script 1470 as displayed in script pane 1416 of script editor window 1400. The test script 1470 includes command lines 1478 and 1479 corresponding to the selection of the header detail button 1125 (FIG. 11) and the entry of the literal value into the data entry field 1203 (FIG. 12). The insertion cursor 1175 (FIG. 11) is repositioned as insertion cursor 1475 following command line 1479.

Command line 1478 includes a context command ("Header") and text indicating the number of times the node is to be executed ("Repeat Count"). Command line 1479 includes an action command ("Type to"), the name of the selected header control that will receive the input ("Company"), and the number of times this action will be taken ("1").

The execution of command lines 1478 and 1479 results in the execution of the application 2 to display application execution window 1500 (FIG. 15), wherein the literal value "1" selected in the literal value pane 1366 (FIG. 13) is input into the "Company" data field 1503. The leading zeros in data field 1503 are determined by the design tool tables 4 and are added automatically under the operation of the application 2.

Although the example of the development of a script shown in FIGS. 5–15 utilized the playback mode for simultaneously developing the test script and executing the application 2, the playback mode may be deactivated to permit the test script to be developed without also executing the application 2. The user can then use the playback cool bar 508 (FIG. 5) to selectively control the playback of the script. The play from top button 551 starts playing back the script from the highest level node (i.e., the first command line) and continues to lower level nodes until the last command line of the script is executed. The play from cursor button 552 enables the user to select a command line in the script where playback is to begin. Playback proceeds from the selected command line to the end of the script.

Activating the step on button 553 indicates that execution of the script will end prior to reaching the end of the script, and is used in conjunction with either the next step button 554 or the continue to breakpoint button 555. The next step button 554 plays back the script one command line at a time according to the command line selected by the user. The continue to breakpoint button 555 plays back the script until a selected breakpoint is reached. A breakpoint can be selected anywhere within the script, and multiple breakpoints are permitted.

At any time during the playback of the script, the stop playback button 556 can be activated to terminate the playback of the script.

In addition to developing the script for testing the operation of the application 2 as shown in FIGS. 5–15, one skilled in the art will appreciate the script can also be used to demonstrate the operation of the application 2 for marketing and tutorial purposes. In addition, the script can also be used to identify operational problems associated with the operation of the application 2. In this regard, it is possible for a user of the application 2 to obtain the script and execute it to produce an error report. The error report can then be forwarded to the developer of the application 2 to determine why the application 2 did not operate as intended, and to propose any corrective measures.

While particular embodiments of the present invention were disclosed, it is to be understood that various different modifications are possible and are contemplated within the true spirit and scope of the appended claims. There is no intention, therefore, of limitations to the exact abstract or disclosure presented herein.

What is claimed is:

1. A system for simulating user input to control the operation of an application, comprising:
    a processor;
    a storage device; and
    software means operative on said processor for selecting application specification information and execution input information indicative of a desired application operation to be stored on said storage device, for constructing execution parameter information from said application specification information, for identifying application parameter information substantially corresponding to said execution parameter information that enables the application to be controlled in accordance with said desired application operation, and for providing said execution input information to said substantially corresponding application parameter information for simulating the user input to achieve said desired application operation, wherein said application specification information is selected from a first list comprising at least one of application identifier information and description information related to at least a first application and from a second list comprising at least one of menu text information, fast path information, and version information.

2. A system according to claim 1, wherein said software means includes a script editor for selecting said application specification information and said execution input information.

3. A system according to claim 2, wherein said script editor is responsive to said selected application specification information and said execution input information for constructing at least one script object to control the operation of the application in accordance with said desired application operation.

4. A system according to claim 1, wherein said software means includes a script preprocessor.

5. A system according to claim 1, wherein said software means includes an operating system interface.

6. A method for simulating user input to control the operation of an application, comprising:
    selecting application specification information and execution input information indicative of a desired application operation, wherein said application specification information is selected from at least a first list comprising at least one of application identifier information, description information, menu text information, fast path information, and version information;
    constructing execution parameter information from said application specification information;
    identifying application parameter information substantially corresponding to said execution parameter information that enables the application to be controlled in accordance with said desired application operation; and
    providing said execution input information to said substantially corresponding application parameter information for simulating the user input to achieve said desired application operation.

7. A method according to claim 6, further including constructing at least one script object to control the operation of the application in accordance with said desired application operation.

8. A method according to claim 7, further including responding to a call from said at least one script object to simulate a user input event.

9. A method according to claim 7, further including maintaining said at least one script object on a storage device.

10. A method according to claim 9, further including transmitting said at least one script object over a network.

11. A system according to claim 6, wherein said at least one of said application identifier information and said description information is contained in said at least a first list, wherein said at least one of said menu text information, said fast path information, and said version information is contained in at least a second list, and wherein items contained in said at least a second list are dependent on at least a first selection from said at least a first list.

12. A system according to claim 6, wherein said step of selecting execution input information comprises at least one of selecting an item from a menu list and entering information in a literal value pane.

13. A computer-usable storage medium having a computer program embodied therein for causing a computing system to simulate user input for controlling the operation of an application by performing the following steps when the computer program is executed on the computing system:

maintaining selected application specification information and execution input information indicative of a desired application operation;

constructing execution parameter information from said application specification information;

identifying application parameter information substantially corresponding to said execution parameter information that enables the application to be controlled in accordance with said desired application operation; and providing said execution input information to said substantially corresponding application parameter information for simulating the user input to achieve said desired application operation, wherein said computer program provides at least a first menu list for selecting said application specification information, and wherein said computer program provides at least one of a menu list and a literal value pane for selecting said execution input information.

14. A system according to claim 1, wherein items contained in said second list are dependent upon at least a first item selected from said first list.

15. A system according to claim 1, wherein said execution input information is selected from a menu list.

16. A system according to claim 15, wherein items contained in said execution input information menu list are dependent upon said selected application specification information.

17. A system according to claim 15, wherein said execution input information menu list includes a literal value item.

18. A system according to claim 17, wherein a literal value may be entered into a provided literal value pane in response to a selection of said literal value item.

19. A method for generating a test script for simulating user input to control the operation of an application, comprising:

populating an application list with at least one of application identifier information and description information, wherein said at least one of application identifier information and description information define at least a first application;

selecting an item provided by said application list;

populating a menu list with information concerning forms associated with said item selected from said application list;

selecting at least a first item provided in said menu list; and developing a test script corresponding to said selections made in said step of selecting an item provided by said application list and in said step of selecting at least a first item provided by said menu list, wherein said test script is capable of simulating user input to control the operation of an application corresponding to said item selected from said application list.

20. The method of claim 19, further comprising:

selecting an insert command; and displaying a modifiable test script.

21. The method of claim 19, further comprising:

executing said test script;

displaying an application window corresponding to said item selected from said application list and said selected at least a first item provided in said menu list;

displaying a script editor window, wherein said script editor window comprises a header control pane populated by a group of header items corresponding to data entry fields included in said application window and an input source pane;

selecting an item displayed in said header control pane; and populating said input source pane with a group of source items.

22. The method of claim 21, further comprising selecting at least one of said source items.

23. The method of claim 22, further comprising selecting an insert command, wherein at least a first command line relating to said item selected from said header control pane and said selected at least one of said source items is added to said test script.

24. The method of claim 21, wherein said group of source items includes a literal value item, and wherein in response to a selection of said literal value item a literal value pane is displayed.

25. The method of claim 19, wherein said selected at least a first item provided in said menu list comprises a first form, said method further comprising:

selecting an add form command;

populating a form list pane with a list of forms associated with said first form;

selecting a second form from said form pane list; and adding at least a first command line to said test script, wherein said added command line relates to said selection of said add form command and said selected second form.

26. The method of claim 19, wherein said information concerning forms associated with said item selected from said application list comprises at least one of menu description information, fast path information, and version information.

* * * * *